United States Patent
Manukyan et al.

(10) Patent No.: US 11,667,537 B2
(45) Date of Patent: Jun. 6, 2023

(54) METHOD OF OBTAINING METAL-CONTAINING NANOPARTICLES

(71) Applicant: Solar Hydrogen Holdings, Inc., Van Nuys, CA (US)

(72) Inventors: Suren Manukyan, Van Nuys, CA (US); Tereza M. Paronyan, Louisville, KY (US); Ievgen Polunkin, Kiev (UA); Hakop Aganyan, Van Nuys, CA (US); Kirill Gichunts, Kiev (UA); Silvia Aganyan, Van Nuys, CA (US); Anahit Markaryan, Van Nuys, CA (US); Avak Avagyan, Granada Hills, CA (US); Robert Avetisyan, Pico Rivera, CA (US); Sirvard Pilossyan, Tarzana, CA (US); Armen Kocharian, Granada Hills, CA (US)

(73) Assignee: Solar Hydrogen Holdings, Inc., Van Nuys (CA)

( * ) Notice: Subject to any disclaimer, the term of this patent is extended or adjusted under 35 U.S.C. 154(b) by 770 days.

(21) Appl. No.: 16/352,672

(22) Filed: Mar. 13, 2019

(65) Prior Publication Data

US 2019/0337815 A1    Nov. 7, 2019

Related U.S. Application Data

(62) Division of application No. 15/855,975, filed on Dec. 27, 2017, now Pat. No. 10,266,419.

(51) Int. Cl.
*C01F 7/42*  (2022.01)
*B82Y 40/00* (2011.01)
(Continued)

(52) U.S. Cl.
CPC .............. *C01F 7/42* (2013.01); *B82Y 40/00* (2013.01); *C01F 7/428* (2013.01); *C25B 1/00* (2013.01);
(Continued)

(58) Field of Classification Search
CPC . C01F 7/42; C01F 7/428; B82Y 40/00; C25B 1/00; C25B 1/04
See application file for complete search history.

(56) References Cited

U.S. PATENT DOCUMENTS 4,169,503 A ‡ 10/1979 Scott ..................... E21B 17/003
166/17
4,479,680 A ‡ 10/1984 Wesley .................. E21B 43/26
166/24
(Continued)

OTHER PUBLICATIONS

Complex connections. Great Soviet Encyclopedia vol. 12, p. 587, 1979.‡

(Continued)

*Primary Examiner* — James A Fiorito
(74) *Attorney, Agent, or Firm* — Georgiy L. Khayet

(57) ABSTRACT

A method for obtaining aluminum-containing nanoparticles is provided. The method includes exposing at least one surface comprising aluminum to an alkaline aqueous solution. The method further includes exposing the at least one surface to electro-hydraulic shock waves and an electron flux. The at least one surface undergoes electro-erosion which creates alumina-hydrated nanoparticles having a negative surface electrical charge. The method further includes transforming the alumina-hydrated nanoparticles into aquachelate nanoparticles by attaching water molecules to the alumina-hydrated nanoparticles.

6 Claims, 18 Drawing Sheets

(51) Int. Cl.
  *C25B 1/00* (2021.01)
  *C25B 1/04* (2021.01)
  *C01F 7/428* (2022.01)
  *B82Y 30/00* (2011.01)

(52) U.S. Cl.
  CPC .................. *C25B 1/04* (2013.01); *B82Y 30/00* (2013.01); *C01P 2002/82* (2013.01); *C01P 2002/85* (2013.01); *C01P 2002/88* (2013.01); *C01P 2004/04* (2013.01); *C01P 2004/64* (2013.01)

(56) References Cited

U.S. PATENT DOCUMENTS

| | | | | |
|---|---|---|---|---|
| 6,802,981 | B2 ‡ | 10/2004 | Ryazanova | C01B 13/11 210/72 |
| 9,353,447 | B2 ‡ | 5/2016 | Balakiryan | C25B 1/06 |
| 2006/0036168 | A1 ‡ | 2/2006 | Liang | A61B 17/2202 600/43 |

OTHER PUBLICATIONS

G. A. Koftun. Theoretical and Experimental Chemistry, vol. 29, Issue 1, pp. 1-12, 1994 (Russian 1993; English 1994).‡

G. A. Mesyats, S. A. Barengolts. High-current vacuum arc as a collective multi-ecton process. Reports of the Academy of Sciences, vol. 375, No. 4.2000.‡

J. Tossell. Theoretical studies on aluminate and sodium aluminate species in models for aqueous solution: Al(OH)3, Al(OH)4 and NaAl(OH)4. American Mineralogist, vol. 84, pp. 1641-1649, 1999.‡

VG Kaplunenko, NV Kosinova, DV Polyakov, ПОlуМ-ЕНМЕ НОВЫХ ВМОFЕННЫХ LA BMOL(MRHbIX НАНОМАТЕРМАЈ1ОВ С ПOMOLL~bIO ЗРОЗМОННО—ВЗРЫВНОГО RMCПEPFMPOBAHMI METAPiDOB, 2007.‡

VVSkopenko, A.Yu.Tsivadze, L.I.Savransky, L.D. Garnovsky.—M.: IKT "Akademkniga" "Coordination Chemistry," (M.:IEC "Academic Book") 2007., p. 312. (Submitted in 12 parts).‡

Zivadze A.U., Structural self-organization in solutions and at the interface of phases. M. Publishing house LKI, 2008-544 C. (Submitted in 13 parts).‡

Carden, Analysis of Electrohydraulic Shock Wave Generation, Proceedings of the ASME 2012 International Mechanical Engineering Congress & Exposition, IMECE2012-85527, Nov. 9-15, 2012. http://proceedings.asmedigitalcollection.asme.org.‡

7 . Maurel, et al., Electrohydraulic shock wave generation as a means to increase intrinsic permeability of mortar, Cem. Concr. Res. (2010), doi: 10.1016/j.cemconres.2010.07.005.‡

Ogden et al., Electrohydraulic high-energy shock-wave treatment for chronic plantar fasciitis. The Journal of Bone and Joint Surgery. 86, 10. 2216-2228. (2004). https://digitalcommons.wustl.edulopen access pubs/936.‡

Wang, Extracorporeal shockwave therapy in musculoskeletal disorders, Journal of Orthopaedic Surgery and Research 2012, 7:11; http://josr-online.com/content/7/1/11.‡

Salem, "Aluminum hydroxide and hydrogen produced by water electrolysis", 2007, Protection of Metals and Physical Chemistry of Surfaces, 45, 752-755 (Year: 2007).‡

Li et al, Ultrasound-assisted electrolysis in NaOH solution for hydrogen generation, 2011, TMS, 919-926 (Year: 2011).‡

Kanehira et al, Controllable hydrogen release via aluminum powder corrosion in calcium hydroxide solutions, 2013, Journal of Asian Ceramic Societies, 1, 296-303 (Year: 2013).‡

O. Maurel, et al., Electrohydraulic shock wave generation as a means to increase intrinsic permeability of mortar, Cem. Concr. Res. (2010), doi: 10.1016/j.cemconres.2010.07.005.

Ogden et al., Electrohydraulic high-energy shock-wave treatment for chronic plantar fasciitis. The Journal of Bone and Joint Surgery. 86, 10. 2216-2228. (2004). https://digitalcommons.wustl.edu/open_access_pubs/936.

‡ imported from a related application

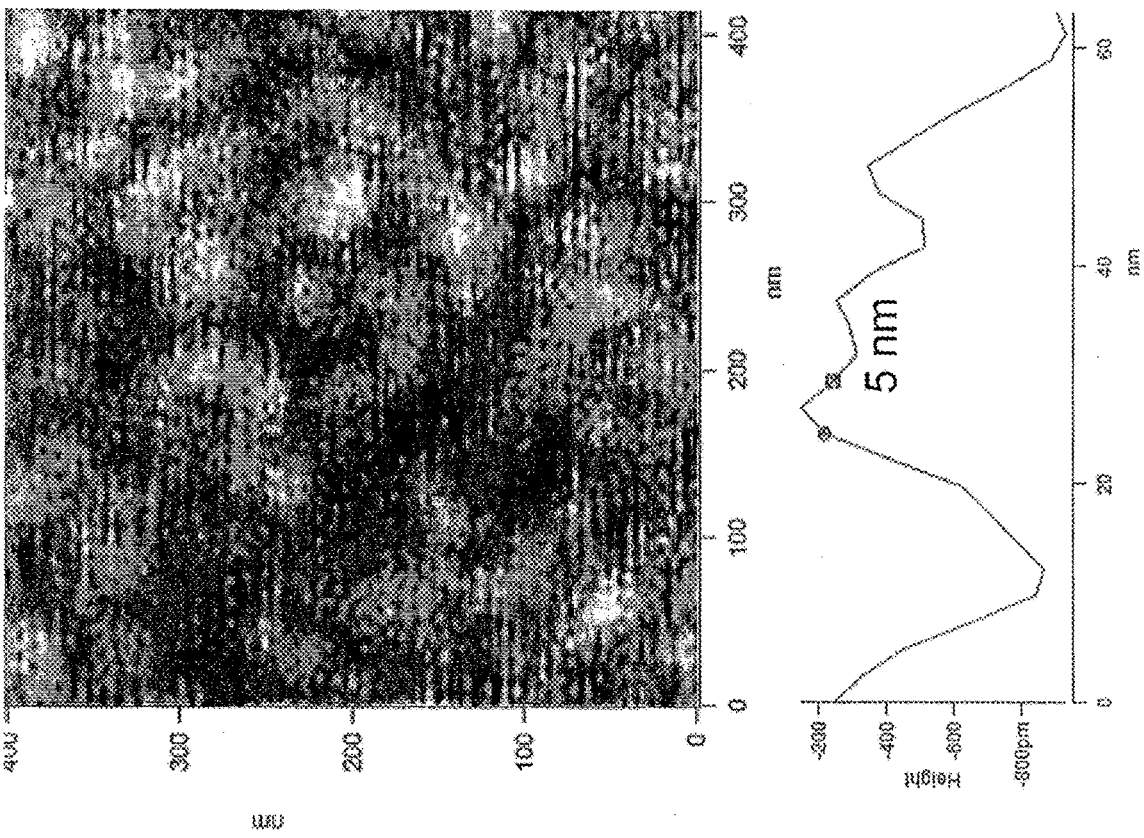
FIG. 5B:
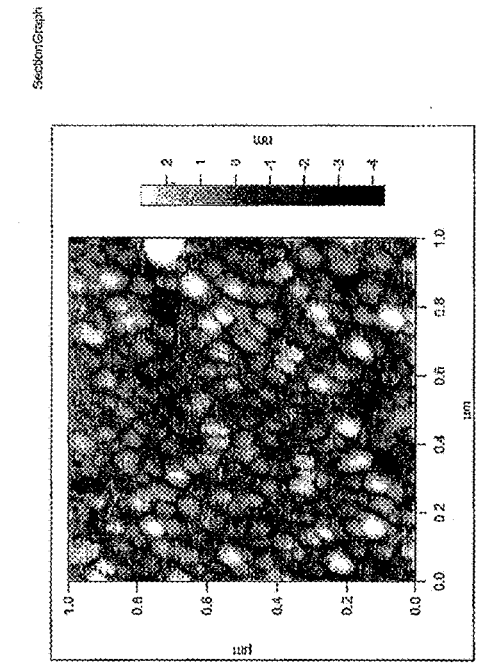
FIG. 5A:
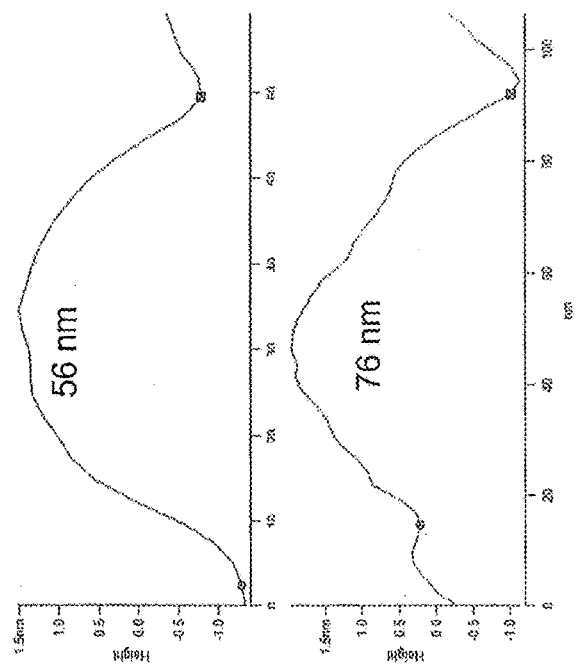

METHOD OF OBTAINING METAL-CONTAINING NANOPARTICLES

CLAIM OF PRIORITY

This application is a divisional of U.S. patent application Ser. No. 15/855,975, filed Dec. 27, 2017, which is incorporated in its entirety by reference herein.

BACKGROUND

Field

This application relates generally to metal- or carbon-containing nanoparticles and methods of obtaining (e.g., fabricating and gathering) such nanoparticles, and more specifically to nanoparticles of aquachelate complexes of metal oxide (hydrated) and/or metal hydroxide, including nanoparticles of aquachelate complexes of aluminum oxide (hydrated) and/or metal hydroxide and methods of obtaining such nanoparticles.

Description of the Related Art

The physical properties of nanoparticles are usually different from those of bulk materials, and new physical and chemical phenomena can occur which depend on the particle sizes of the nanoparticles (e.g., a change of particle size can change the system properties). Nanoparticles with smaller particle sizes can have higher fractions of their atoms as "surface atoms" (e.g., atoms having fewer neighboring atoms than do atoms in a bulk material) with the remaining fraction of their atoms as "bulk atoms" (e.g., atoms having the same number of neighboring atoms as do atoms in the bulk material). By virtue of having different numbers of neighboring atoms, these "surface atoms" can have attributes (e.g., energies; bonds) which differ from those of the atoms in a "bulk" configuration. Energetically, a decrease in particle size can lead to an increase of surface energy, and smaller size particles tend to minimize their surface energy by agglomeration, thereby stabilizing the system containing the nanoparticles.

SUMMARY

Certain embodiments described herein provide a method for obtaining aluminum-containing nanoparticles. The method comprises exposing at least one surface comprising aluminum to an alkaline aqueous solution. The method further comprises exposing the at least one surface to electro-hydraulic shock waves and an electron flux. The at least one surface undergoes electro-erosion which creates alumina-hydrated nanoparticles having a negative surface electrical charge. The method further comprises transforming the alumina-hydrated nanoparticles into aquachelate nanoparticles by attaching water molecules to the alumina-hydrated nanoparticles.

Certain embodiments described herein provide a method of obtaining clusters of metal oxide (hydrated) and/or hydroxide aquachelates. The method comprises immersing at least a portion of a metal-containing surface in an electrolytic bath comprising water. The method further comprises applying a voltage to the portion of the metal-containing surface and generating hydrogen gas and oxygen gas from the water via electrolysis. The method further comprises creating clusters of metal oxide (hydrated) and/or hydroxide aquachelates using metal atoms from the portion of the metal-containing surface. The metal oxide (hydrated) and/or hydroxide aquachelates have sizes less than or equal to 5 nanometers.

Certain embodiments described herein provide a method of obtaining metal- or carbon-containing nanoparticles. The method comprises immersing at least a portion of a surface in an electrolytic bath comprising water. The surface comprises a metal- or a carbon-containing material. The method further comprises applying a voltage to the portion of the surface and generating hydrogen gas and oxygen gas from the water via electrolysis. The method further comprises creating nanoparticles using atoms of the metal- or carbon-containing material from the portion of the surface. The nanoparticles have sizes less than or equal to 5 nanometers.

BRIEF DESCRIPTION OF THE DRAWINGS

FIGS. 5A and 5B show Atomic Force Microscopy (AFM) images and size estimations of the aluminum-containing nanoparticles and clusters formed in accordance with certain embodiments described herein.

DETAILED DESCRIPTION

Certain embodiments described herein provide aluminum-containing nanoparticles (e.g., aquachelate complexes of aluminum oxide (hydrated) and/or aluminum hydroxide), and certain embodiments described herein provide a method of obtaining (e.g., fabricating and gathering) such nanoparticles (e.g., with the simultaneous release of hydrogen gas).

For example, in certain embodiments, aluminum-containing nanoparticles (e.g., having a size in a range between 1 nanometer and 5 nanometers; having a size in a range between 1 nanometer and 30 nanometers) can be generated within an alkaline aqueous solution (e.g., an aqueous solution comprising sodium hydroxide) that includes the presence of high electron density, hydrogen gas flow, and oxygen gas flow. For example, the density of electrons, the flows of gaseous hydrogen and oxygen can be provided by the reactions of an aluminum plate with an electrolyte, via electrolysis upon applying a voltage and a hydraulic shock. These parameters can vary within wide limits, and can be dependent on various factors, including but not limited to, the environment of the aluminum plate, the pH of the electrolyte solution, the temperature of the electrolyte solution, and the magnitude of the applied voltage. Without being bound by theory, aluminum nanoparticles can be formed by the electrolysis and hydraulic shock, and subsequent processes in the environment of the gaseous hydrogen and oxygen flows can result in the formation of aluminum oxide, hydroxide, and hydroxide complexes based on the aluminum nanoparticles. In certain such embodiments, lower electron densities and/or lower flows of gaseous hydrogen and oxygen can result in lower rates of obtaining clusters of the aluminum-containing nanoparticles, and correspondingly, higher electron densities and/or higher flows of gaseous hydrogen and oxygen can result in higher rates of obtaining clusters of the aluminum-containing nanoparticles (e.g., reducing the time to produce a predetermined amount of clusters).

Figure 1A:
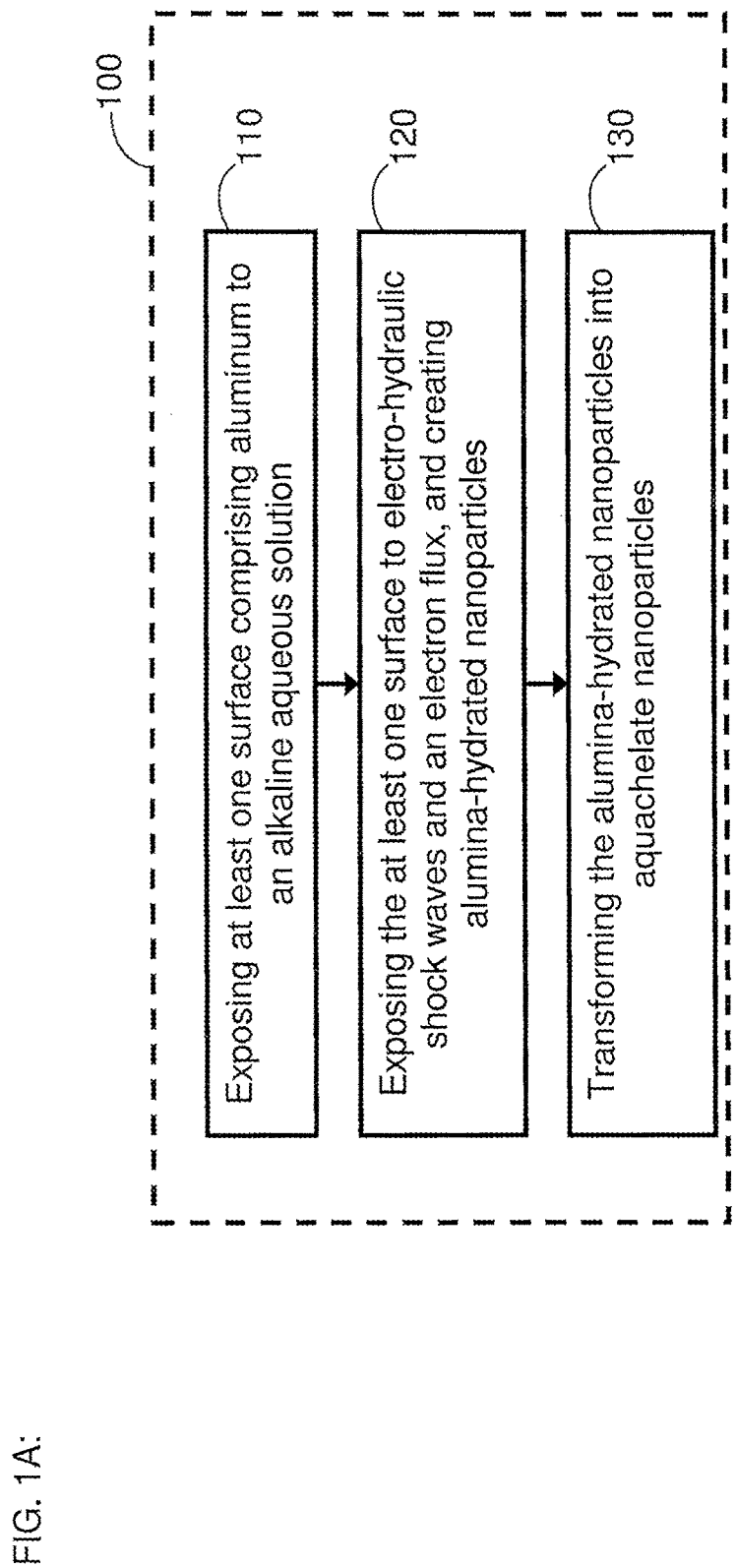
FIG. 1A is a flow diagram of an example method for obtaining aluminum-containing nanoparticles in accordance with certain embodiments described herein.

FIG. 1A is a flow diagram of an example method 100 for obtaining aluminum-containing nanoparticles (e.g., aquachelate complexes of aluminum oxide (hydrated) and/or aluminum hydroxide) in accordance with certain embodiments described herein. In an operational block 110, the method 100 comprises exposing at least one surface comprising aluminum (e.g., at least one surface of at least one aluminum metallic plate) to an alkaline aqueous solution. In an operational block 120, the method 100 further comprises exposing the at least one surface to electro-hydraulic shock waves and an electron flux, wherein the at least one surface undergoes electro-erosion (e.g., electro-erosion destruction; erosion-explosive dispersion; electro-erosive pulse) which creates alumina-hydrated nanoparticles (e.g., $Al_2O_3 \times 3H_2O$; chelates). The alumina-hydrated nanoparticles can have a negative surface electrical charge. In an operational block 130, the method 100 further comprises transforming the alumina-hydrated nanoparticles into aquachelate nanoparticles by attaching water molecules to the alumina-hydrated nanoparticles (e.g., chelating the alumina-hydrated nanoparticles with water molecules).

Figure 1B:
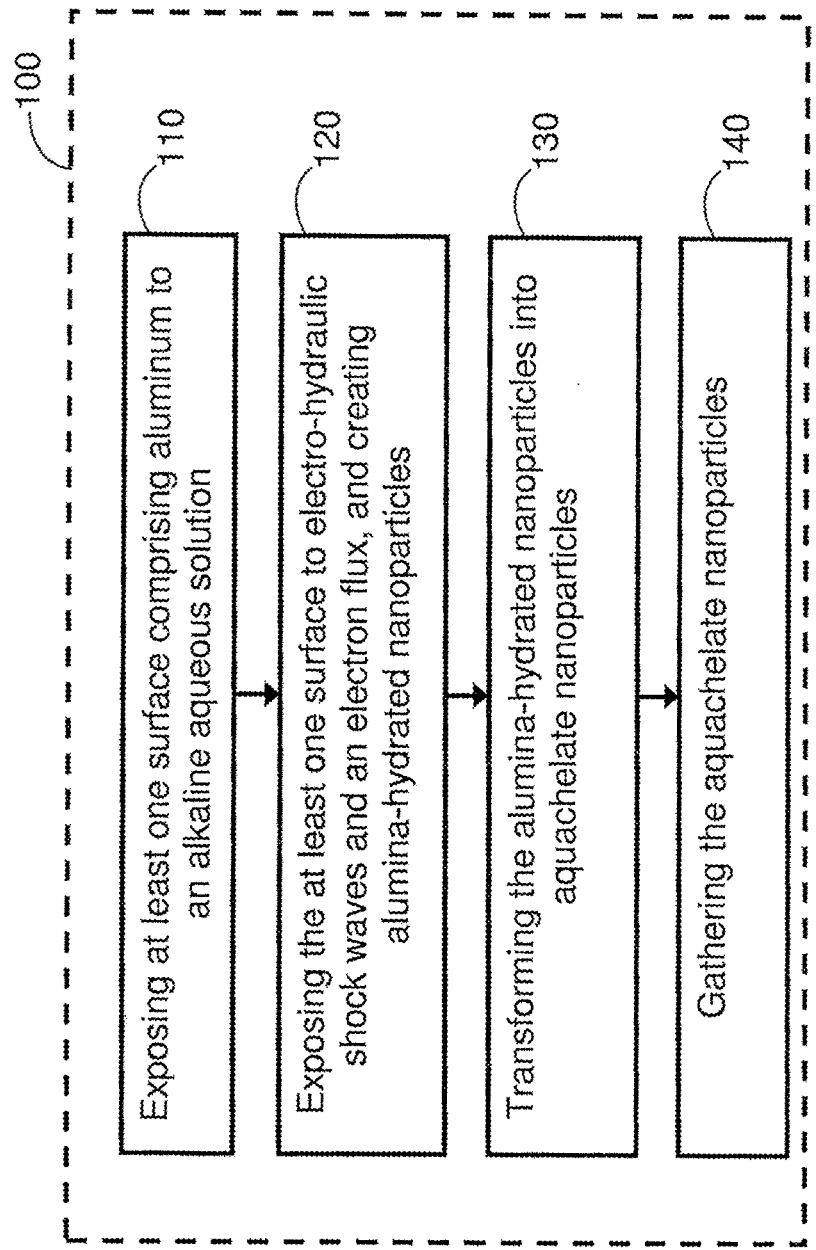
FIG. 1B is a flow diagram of another example method for obtaining aluminum-containing nanoparticles in accordance with certain embodiments described herein.

FIG. 1B is a flow diagram of another example method 100 for obtaining aluminum-containing nanoparticles (e.g., aquachelate complexes of aluminum oxide (hydrated) and/ or aluminum hydroxide) in accordance with certain embodiments described herein. The method 100 of FIG. 1B includes all the operational blocks 110, 120, 130 of the method 100 of FIG. 1A. The method 100 of FIG. 1B further comprises, in an operational block 140, gathering the aquachelate nanoparticles. For example, gathering the aquachelate nanoparticles can comprise removing the aquachelate nanoparticles from the alkaline aqueous solution (e.g., removing the aquachelate nanoparticles from the electrolytic bath) and storing the aquachelate nanoparticles for future use. For another example, the aquachelate nanoparticles can be gathered in a water suspension, dried (e.g., removing water molecules using a freeze-dryer), and annealed (e.g., at 220 C), producing aluminum oxide nanoparticles, which can be stored for future use. In certain embodiments, by virtue of chelating the alumina-hydrated nanoparticles with water molecules, the resultant aquachelate nanoparticles can easily penetrate through membrane cells, and can easily "open" which creates the environment for its high activity.

In certain embodiments, the at least one surface comprising aluminum comprises at least one solid surface of metallic aluminum. The at least one surface can comprise an aluminum oxide layer. The at least one surface can be flat, curved, stepped, and/or irregular, and the at least one surface can include one or more protrusions, depressions, and/or holes.

In certain embodiments, the alkaline aqueous solution comprises sodium hydroxide or other materials that react with the metal. The reaction rate can be dependent on the pH and/or the temperature of the alkaline aqueous solution, and the amount of nanoparticles produced can be increased or decreased accordingly. Exposing the at least one surface to the alkaline aqueous solution can comprise placing the at least one surface in contact with the alkaline aqueous solution (e.g., immersing at least a portion of the at least one surface in the alkaline aqueous solution).

In certain embodiments, exposing the at least one surface to electro-hydraulic shock waves and an electron flux in the operational block 120 comprises using the at least one surface as an electrode (e.g., a bulk aluminum electrode) in a system configured to generate hydrogen gas and oxygen gas from the water (e.g., using electrolysis). For example, hydrogen gas can be generated by generating electrical discharges within the water of the alkaline aqueous solution (e.g., an electrolytic bath), using the water to perform oxidation of the at least one surface within the water (e.g., immersed within the electrolytic bath), flowing an electric current through the water, and performing electrolysis within the water using the electric current and heat from the oxidation (see, e.g., PCT Publ. No. WO2015/005921A1 and U.S. Pat. No. 9,353,447, each of which is incorporated in its entirety by reference herein). The electron flux of certain embodiments can be dependent on the applied voltage and the parameters of the medium surrounding the electrode.

Without being bound by theory, in certain embodiments, the surface electrical charge of the alumina-hydrated nanoparticles created in the operational block 120 results from electron emission from the at least one surface comprising aluminum during the electro-erosion of the at least one surface. The electron emission can arise from explosions of local sections of the at least one surface (see, e.g., G. A. Mesyats and S. A. Barengolts, "High-current vacuum arc as a collective multi-ecton process," Reports of the Academy of Sciences, Vol. 375, Number 4, 2000). During the electron emission, high density electron fluxes can be formed in the aqueous solution, and alumina-hydrated nanoparticles (e.g., chelates) within the flow of electrons can acquire negative surface electrical charge. Without being bound by theory, in certain embodiments, the alumina-hydrated nanoparticles are formed as a result of the erosion-explosive process, and are separated from the surface of the bulk aluminum electrode and immediately transferred into the alkaline aqueous solution. The negatively-charged alumina complexes of nanoparticles can have a structural form that is similar to the well-known structural form of anionic chelate complexes.

Since the electron emission occurs in the water of the alkaline aqueous solution, the alumina-hydrated nanoparticles can be chelated with water molecules to transform into aquachelate nanoparticles in which water molecules perform the role of the ligands. Without being bound by theory, in certain embodiments, the negatively-charged supramolecular aquachelate nanoparticles are formed under the influence of the electrical discharge around which (e.g., in the zone of polarized space) the domains of polarized solvent molecules are formed (see, e.g., Zivadze A. U, "Structural self-organization in solutions and at the interface of phases," M. Publishing House LKI, 2008-544 C). The aquachelate nanoparticles can have a coordination number (e.g., number of atoms or ligands linked to the central group of metal atoms) that is dependent on the number of electron pairs of the negative surface charge of the aquachelate nanoparticles.

For well-known chelate complexes, the coordination number generally does not exceed 12 (see, e.g., "Complex connections," Great Soviet Encyclopedia, Vol. 12, Page 587 1979), and this coordination number can be the main limitation to obtaining stable and controlled structures for these well-known chelate complexes. The aquachelate nanoparticles of certain embodiments described herein can have a coordination number greater than 12. As used herein, the term "coordination number" has its broadest reasonable interpretation, including the number of donated atoms or molecules by which ligands are linked to the central group of metal atoms (e.g., the number of water molecules and hydroxyl groups bonded to or within the zone of influence of the charge of the alumina-hydrated nanoparticle, forming a solvate cluster with a solvation shell).

In certain embodiments, the erosion-explosive dispersion process can electrically charge a generally spherical alumina-hydrated nanoparticle to have a surface charge that is generally uniformly distributed across the surface of the generally spherical alumina-hydrated nanoparticle. For example, the smallest alumina-hydrated nanoparticles can have a diameter in a range from 1.6 nanometers to 2 nanometers and can have a generally spherical shape, and the surface charge of the smallest alumina-hydrated nanoparticles can be greater than or equal to $4 \times 10^{-18}$ Coulomb. The negative surface charge of the alumina-hydrated nanoparticles can attach water molecules to the alumina-hydrated nanoparticles, the water molecules being dipoles with positive charge at the hydrogen nuclei, thereby transforming the alumina-hydrated nanoparticles into aquachelate nanoparticles. In certain embodiments, the stability of the aquachelate nanoparticle is achieved regardless of its size, since the surface electrical charge of the alumina-hydrated nanoparticle, and consequently its coordination number, is proportional to its size and different alumina-hydrated nanoparticles acquire approximately the same charge density from the electron fluxes.

Without being bound by theory, in certain embodiments, the creation of alumina-hydrated nanoparticles in the operational block 120 of the example method 100 can include one or more of the following chemical reactions:

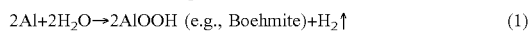
$$2Al+2H_2O \rightarrow 2AlOOH \text{ (e.g., Boehmite)}+H_2\uparrow \quad (1)$$

$$2Al+3H_2O \rightarrow \gamma\text{-}Al_2O_3 \text{ (e.g., Bayeritte)}+3H_2\uparrow \quad (2)$$

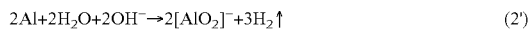
$$2Al+2H_2O+2OH^- \rightarrow 2[AlO_2]^- +3H_2\uparrow \quad (2')$$

In certain embodiments in which chemical equation (2) occurs, the $\gamma$-$Al_2O_3$ (e.g., $\gamma$-aluminum oxide) can interact with water molecules of the alkaline aqueous solution (e.g., $\gamma$-$Al_2O_3$+3$H_2O$=$\gamma$-$Al_2O_3 \times 3H_2O$) and can convert into aluminum hydroxide (e.g., $\gamma$-$Al_2O_3 \times 3H_2O \leftrightarrow 2Al(OH)_3$).

In a strong electric field (e.g., generated by applying a voltage to the portion of the surface in the alkaline aqueous solution to generate hydrogen gas and oxygen gas via electrolysis), under the influence of an electric discharge, the aluminum hydroxide can undergo the following chemical reaction to produce a new form of aquachelates:

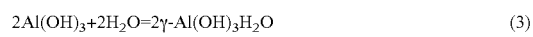
$$2Al(OH)_3+2H_2O=2\gamma\text{-}Al(OH)_3H_2O \quad (3)$$

Such aquachelates have been previously suggested theoretically (see, e.g., J. A. Tossell, "Theoretical studies on aluminate and sodium aluminate species in models for aqueous solution: $Al(OH)_3$, $Al(OH)^-_4$ and $NaAl(OH)_4$," American Mineralogist, Volume 84, pages 1641-1649, 1999), but have never been reported experimentally. To obtain the electrical discharge, the charging voltage can be 1000 V or greater, with a magnitude dependent on the parameters of the alkaline aqueous solution (e.g., lower conductivity of the solution may utilize a higher charging voltage and a higher conductivity of the solution may utilize a lower charging voltage).

Figure 2:
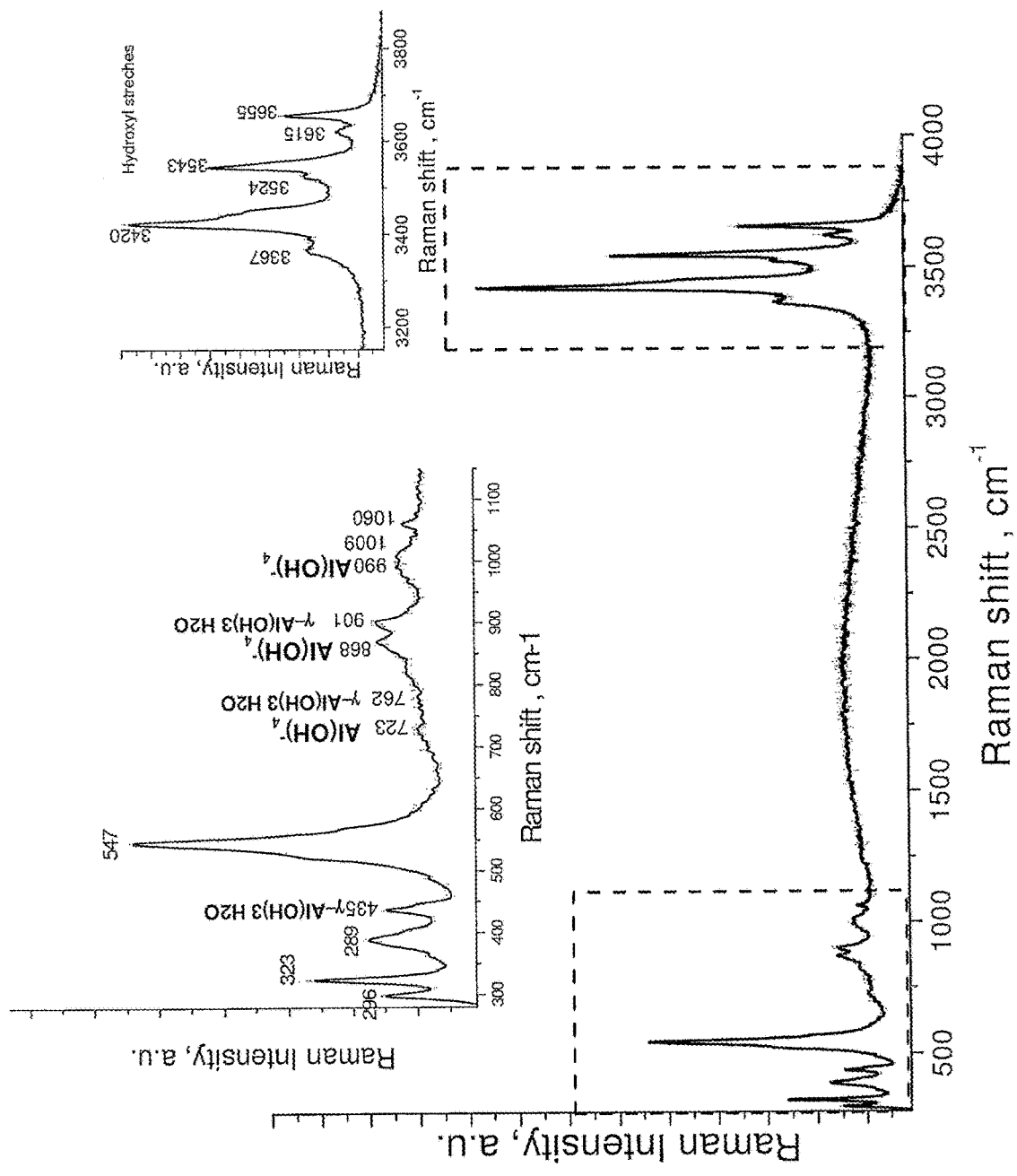
FIG. 2 shows a Raman spectrum of aluminum-containing nanoparticles obtained in accordance with certain embodiments described herein.
Figure 3:
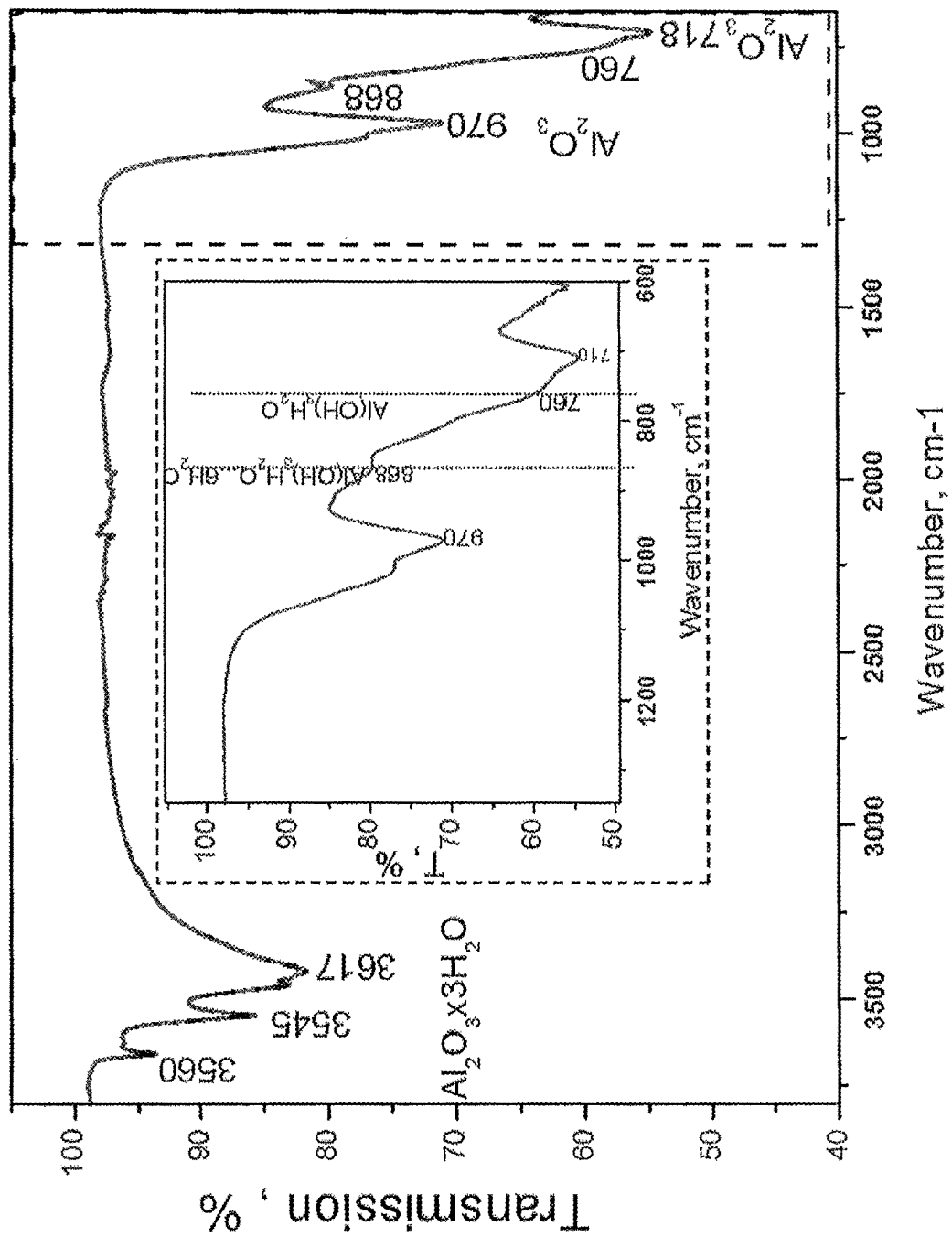
FIG. 3 shows a Fourier Transform Infrared (FTIR) spectrum of aluminum-containing nanoparticles obtained in accordance with certain embodiments described herein.

FIGS. 2-9 show various experimental measurements taken from samples of aluminum-containing nanoparticles obtained in accordance with certain embodiments described herein (these samples included some amount of $Al_2O_3 \times 3H_2O$). FIG. 2 shows a Raman spectrum of aluminum-containing nanoparticles obtained in accordance with certain embodiments described herein. The insets of FIG. 2 show magnified ranges of the low and high wavenumber regions. The Raman spectrum was obtained using excitation wavelength of $\lambda$=638 nm and exhibits new peaks at 435 cm$^{-1}$, 762 cm$^{-1}$, and 901 cm$^{-1}$, which can be interpreted to be indicative of the presence of the aquachelate nanoparticles (e.g., $Al(OH)_3H_2O$). FIG. 3 shows a Fourier Transform Infrared (FTIR) spectrum of aluminum-containing nanoparticles obtained in accordance with certain embodiments described herein. The inset of FIG. 3 shows a magnified range of the low wavenumber region. The FTIR peaks at 760 cm$^{-1}$ and 868 cm$^{-1}$ wavenumbers can be associated to $Al(OH)_3H_2O$ and $Al(OH)_3H_2O \ldots 6H_2O$. The aquachelates of equation (3) can be joined with 10 water molecules, e.g.:

$$2\gamma\text{-}Al(OH)_3H_2O+10H_2O \rightarrow 2Al(OH)_3H_2O \ldots 6H_2O \quad (4)$$

to generate a new metastable aquachelate form of aluminum hydroxide $Al(OH)_4^-$. This aquachelate form can be confirmed by the presence of new peaks in the Raman spectra (e.g., at 723 cm$^{-1}$, 868 cm$^{-1}$, and 990 cm$^{-1}$, as shown in FIG. 2), and can spontaneously convert into solvated aluminum tetrahydroxide (in the alkaline aqueous solution), with proton emission and heat release in an amount of 2.3 kcal/mol=9.672 KJ/mol, as expressed by the following chemical equation:

$$2[Al(OH)_3H_2O \ldots 6H_2O] \rightarrow 2[Al(OH)_4^- \ldots 6H_2O]+ 2H^+ \quad (5)$$

Figure 4:
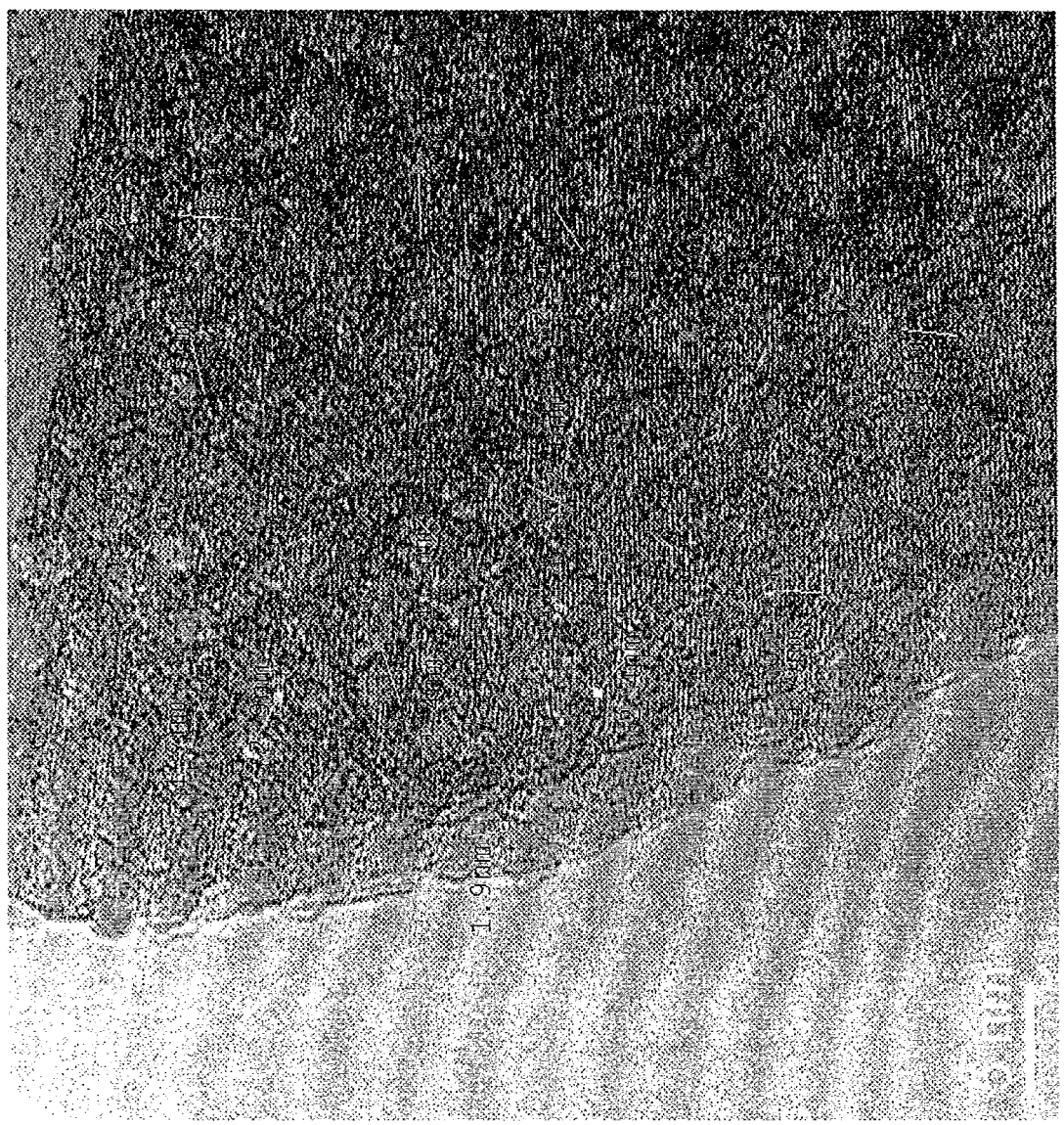
FIG. 4 shows a High Resolution Transmission Electron Microscope (HRTEM) image of aluminum-containing nanoparticles in clusters formed in accordance with certain embodiments described herein.

The coordination number for the nanoparticles synthesized in accordance with certain embodiments described herein can have large values, that had been previously unattainable using known complexing agents. Moreover, in certain embodiments, chelation of nanoparticles by water molecules due to hydrogen bonds of water molecules with the electrically charged surfaces of nanoparticles can lead to the formation of stable chelate complexes without the addition of other ligands. It can be difficult to determine the coordination number for the nanoparticles. While the concept of coordination number is originally taken from the classical Werner theory and has a well-defined meaning for individual chemical compounds (e.g., complex compounds having a crystal lattice, known distances between atoms, melting point, and other physiochemical characteristics), the nanoparticles described herein can be negatively-charged nanoclusters. Without being bound by theory, these nanoclusters attract polarized water molecules and, due to the dispersion interaction forces (e.g., Van Der Waals forces; hydrogen bonds, etc.), and retain a large number of water molecules in their sphere of influence. By way of analogy with other aquachelates, with an example diameter of 2 nanometers, the number of water molecules retained by the nanoparticles can be in a range between $1\times10^4$ to $5\times10^5$, and with an example diameter of 20 nanometers, the number of water molecules retained by the nanoparticles can be in a range between $1\times10^9$ to $2\times10^9$, Other methods of physical-chemical analysis (e.g., HRTEM, XPS, TGA, SEM, AFM, XRD, DSC, EDS (EDX)) have been used to characterize the aluminum-containing nanoparticles formed during the synthesis in accordance with certain embodiments described herein. FIG. 4 shows a high resolution transmission electron microscope (HRTEM) image of aluminum-containing nanoparticles in clusters formed in accordance with certain embodiments described herein. As shown in the HRTEM image of FIG. 4, the sizes of the aluminum-containing nanoparticles in the clusters are predominantly in the range of 1.5 nanometers to 2.6 nanometers. FIGS. 5A and 5B show atomic force microscopy (AFM) images and size estimations of the aluminum-containing nanoparticles and clusters formed in accordance with certain embodiments described herein. The estimated nanoparticle size is in the range of 2 nanometers to 6 nanometers, which are joined into cluster sizes in the range of 50 nanometers to 130 nanometers. The existence of water molecules attached to the surface of the nanoparticles may be the reason of larger size estimations from AFM (e.g., FIGS. 5A and 5B) as compared to HRTEM (e.g., FIG. 4).

For aluminum oxides, crystallographic studies have established the following lengths or ranges of lengths of the bonds between atoms:

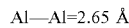

Al—Al=2.65 Å

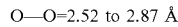

O—O=2.52 to 2.87 Å

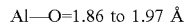

Al—O=1.86 to 1.97 Å and the characteristic size of the hexagonal cell of aluminum oxide (e.g., $\gamma$-$Al_2O_3$) is 12.957 Å by 4.478 Å (which can be approximated as 1.3 nanometers by 0.45 nanometer). The effective radius of the oxygen $O^{2-}$ is 1.28 Å, and the effective radius of the aluminum ion $Al^{3+}$ is 0.5 Å (0.05 nanometer) with an assumption of dense packing, with the aluminum positioned in the voids between oxygen (quantitatively ~23 out of the number of oxygen atoms). For an oxygen-oxygen bond length of $L_{O-O}$=2.87 Å=0.287 nanometer, the number of oxygen atoms in the cluster N can be equal to: $(2/0.287)^3$=$6.9686^3$≈$7^3$=343 atoms of $O^{2+}$. The number of aluminum atoms $N_{Al}$ can be two-thirds of the number of oxygen atoms, located in voids, $N_{Al}$=229 atoms. In certain embodiments described herein, these 229 aluminum atoms are provided by the aluminum-containing surface (e.g., the surface of a metallic aluminum plate) during the electro-erosive pulse.

Figure 6:
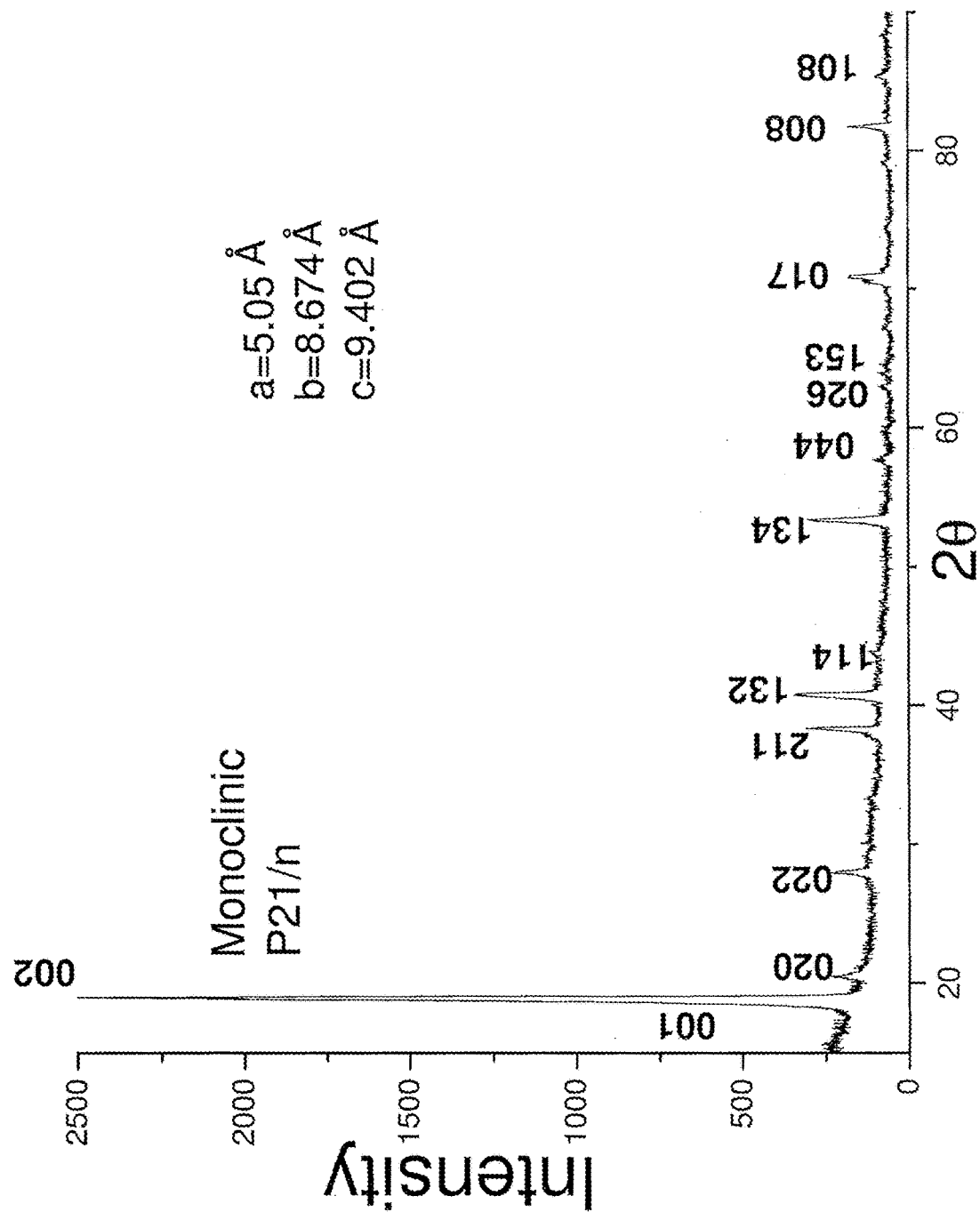
FIG. 6 shows an X-ray Diffraction (XRD) pattern of aluminum-containing nanoparticles formed in accordance with certain embodiments described herein.

During oxidation, the initially formed $\gamma$-form of aluminum oxide can have a hexagonal unit cell with a height h=1.3 nanometers, and side length of the hexagon a=0.45 nanometer $$\left(S = 3\frac{\sqrt{3}}{2}a^2; V = S \cdot h\right),$$

and a unit cell volume V=0.684 $nm^3$. Without being bound by theory, in certain embodiments, during the process of solvation, hydration, and reaction with the water in an alkaline environment, and under exposure to electric pulses, a new form of aluminum hydroxide can be formed: 2[Al(OH)$_3$H$_2$O . . . 6H$_2$O]. This form of aluminum hydroxide can have a monoclinic cell with unit cell parameters of a=0.505 nm, b=0.867 nm, and c=0.94 nm. FIG. 6 shows an x ray diffraction (XRD) pattern of aluminum-containing nanoparticles formed in accordance with certain embodiments described herein. The XRD pattern of FIG. 6 is indicative of the monoclinic unit cell having a unit cell volume V=0.867×0.94×0.505=0.412 $nm^3$.

Without being bound by theory, in certain embodiments, such a transition of structure of a unit cell of a nanoscale cluster with a volume change of 59.8% can occur with the adoption of an electron and ejection of a proton (which further takes an electron and forms hydrogen), thus working as a proton pump (e.g., an electrochemical generator) to decompose water. Such a process was previously studied in detail in conjunction with the mechanism of action of plant and bacterial ferredoxins based on nanoscale clusters with a Fe$_4$S$_4$ frame (see, e.g., G. A. Koftun, "Theoretical and Experimental Chemistry." Volume 29, Issue 1, pp. 1-12, 1994).

Without being bound by theory, in certain embodiments, at least some of the protons can react with aluminum tetrahydroxide in the nanoparticles according to the following equations:

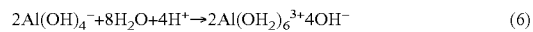

2Al(OH)$_4^-$+8H$_2$O+4H$^+$→2Al(OH$_2$)$_6^{3+}$+4OH$^-$ (6)

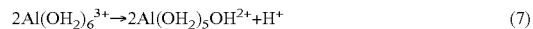

2Al(OH$_2$)$_6^{3+}$→2Al(OH$_2$)$_5$OH$^{2+}$+H$^+$ (7)

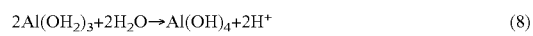

2Al(OH$_2$)$_3$+2H$_2$O→Al(OH)$_4$+2H$^+$ (8)

and the resulting nanoparticle structure can have a new form of aluminum hydride-hydroxide that retains an excessive amount of [OH$^-$] groups in the nanoparticles after liberation of hydrogen. The surface of such a nanoparticle, containing a large number of OH groups (e.g., after liberation of hydrogen), can be stabilized by sodium cations according to the following equation:

2Al(OH)$_4^-$+2Na$^+$→2NaAl(OH)$_4$ (9)

Figure 7:
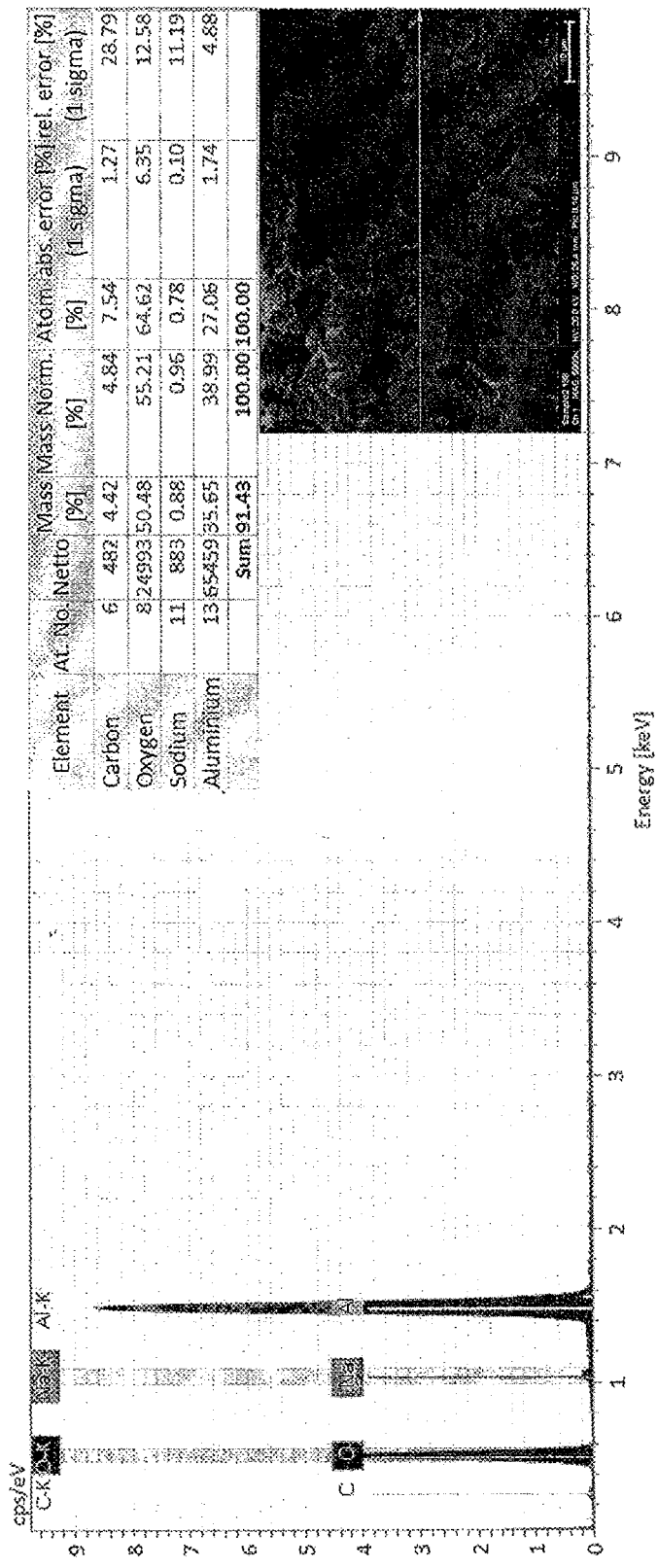
FIG. 7 shows an Energy Dispersion Spectrum (EDS) of aluminum-containing nanoparticles formed in accordance with certain embodiments described herein.
Figure 8A:
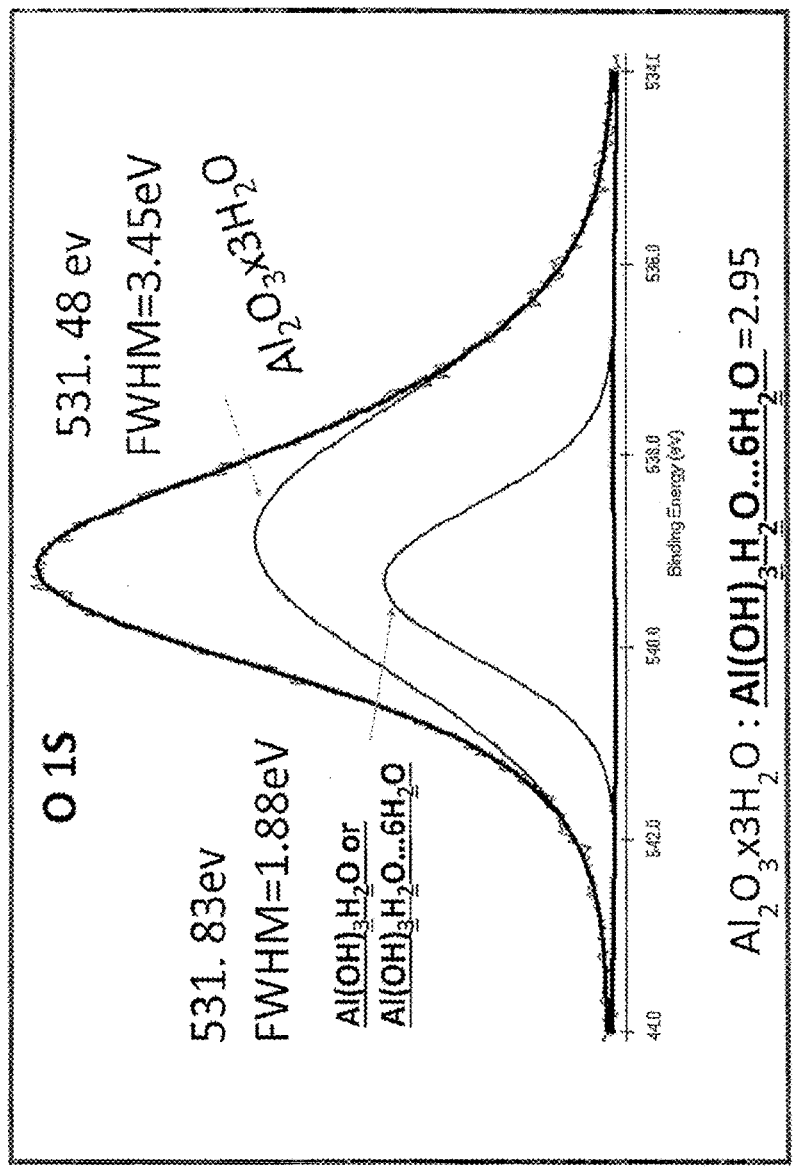
FIGS. 8A-8D show XPS spectra of aluminum-containing nanoparticles formed in accordance with certain embodiments described herein.
Figure 8B:
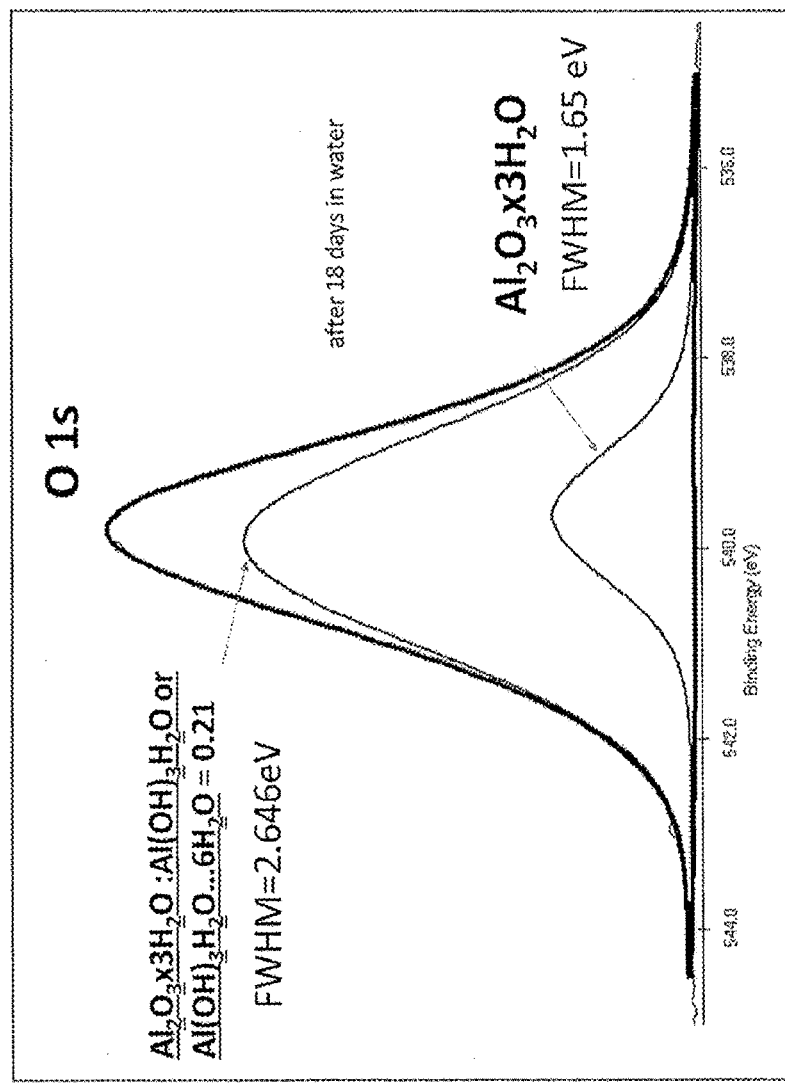
Figure 8C:
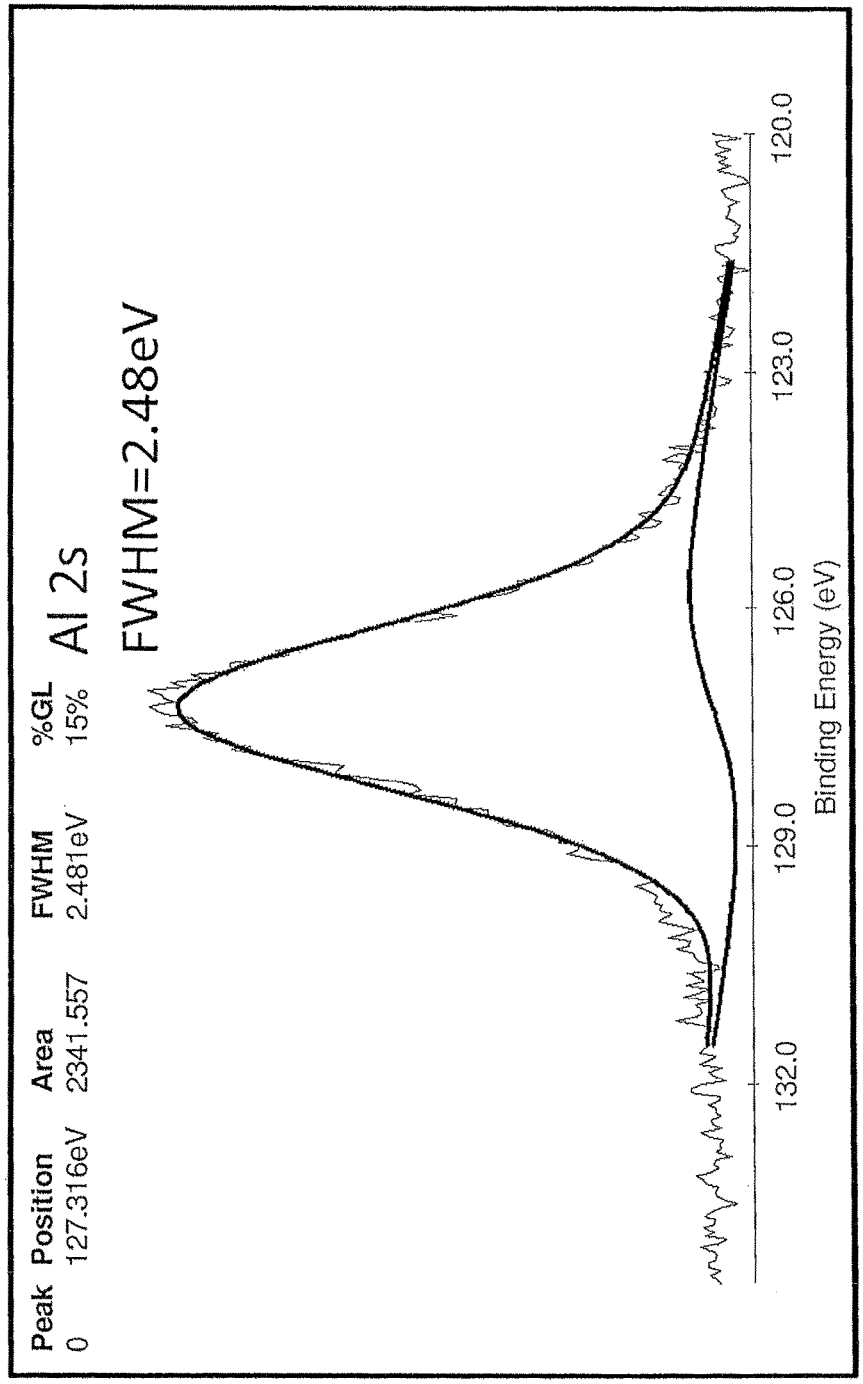
Figure 8D:
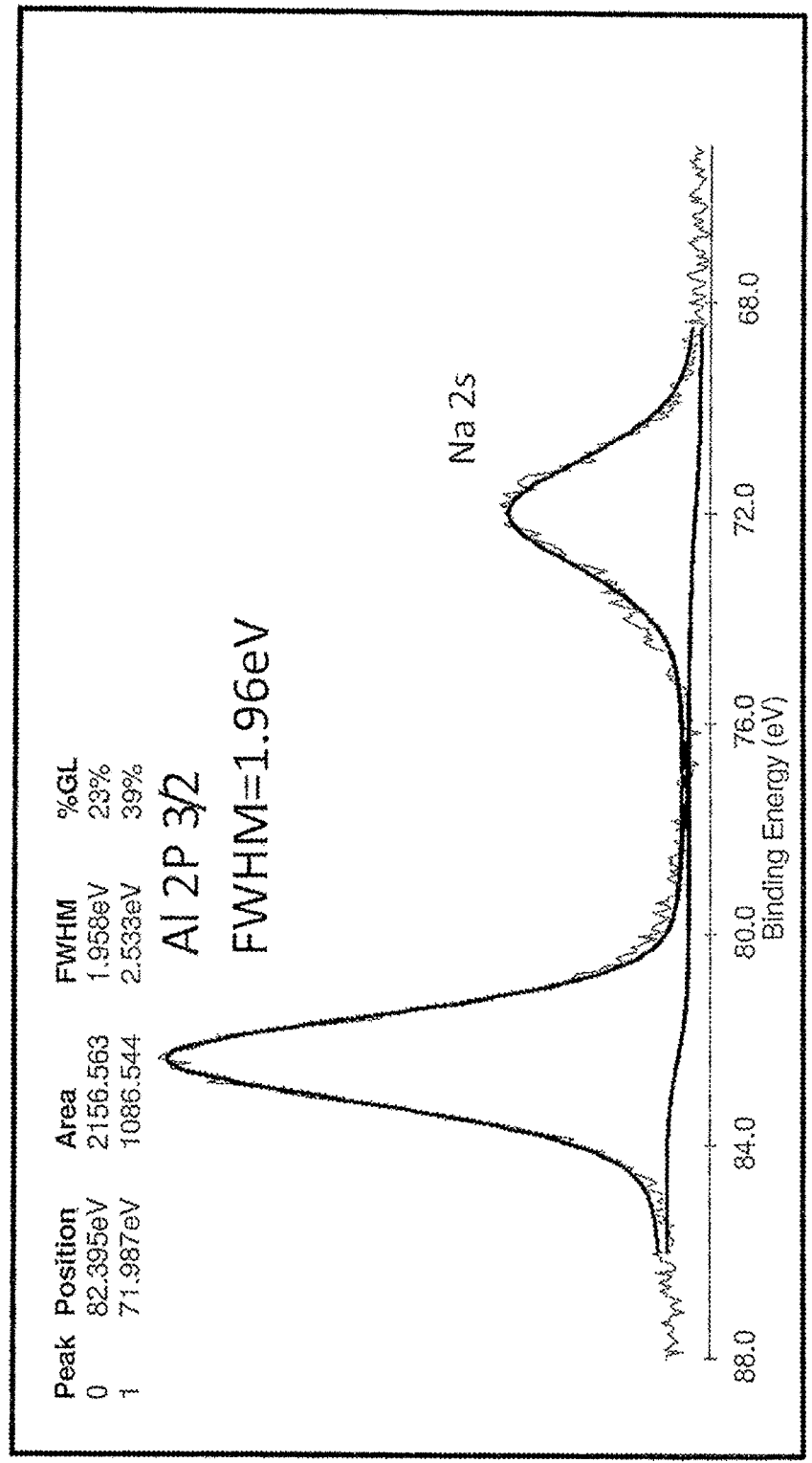

FIG. 7 shows an energy dispersion spectrum (EDS) of aluminum-containing nanoparticles formed in accordance with certain embodiments described herein. The insets of FIG. 7 show an elemental composition of the dried nanopowder and the area of linear scanning in a scanning electron microscope image. The elemental analysis of the dried nanopowder confirms the presence of Na on the surface of the nanoparticles. FIGS. 8A-8D show x ray photoemission spectroscopy (XPS) data for the aluminum-containing nanoparticles formed in accordance with certain embodiments described herein. FIG. 8A shows the XPS data for the oxygen 1s spectrum after two days, while the surfaces of the nanoparticles are still charged. FIG. 8B shows the XPS data for the oxygen 1s spectrum after 18 days in water when the aquachelates are dominated in the clusters compared to Al$_2$O$_3$×3H$_2$O. The ratio of aquachelates to Al$_2$O$_3$×3H$_2$O was estimated by the ratio XPS 1s peak areas (with sensitivity factors taken into account). FIG. 8C shows the XPS data for the aluminum 2s spectrum and FIG. 8D shows the XPS data for the aluminum 2p3/2 spectrum after 18 days. The XPS analysis reveals the following ratio of elements on the surface of the dried nanopowder: 2[Na2s]:3[Al2s]: 18[O2s], which corresponds to the mixture of $2NaAl(OH)_4$ and $Al(OH)_3H_2O \ldots 6H_2O$ compounds.

Figure 9:
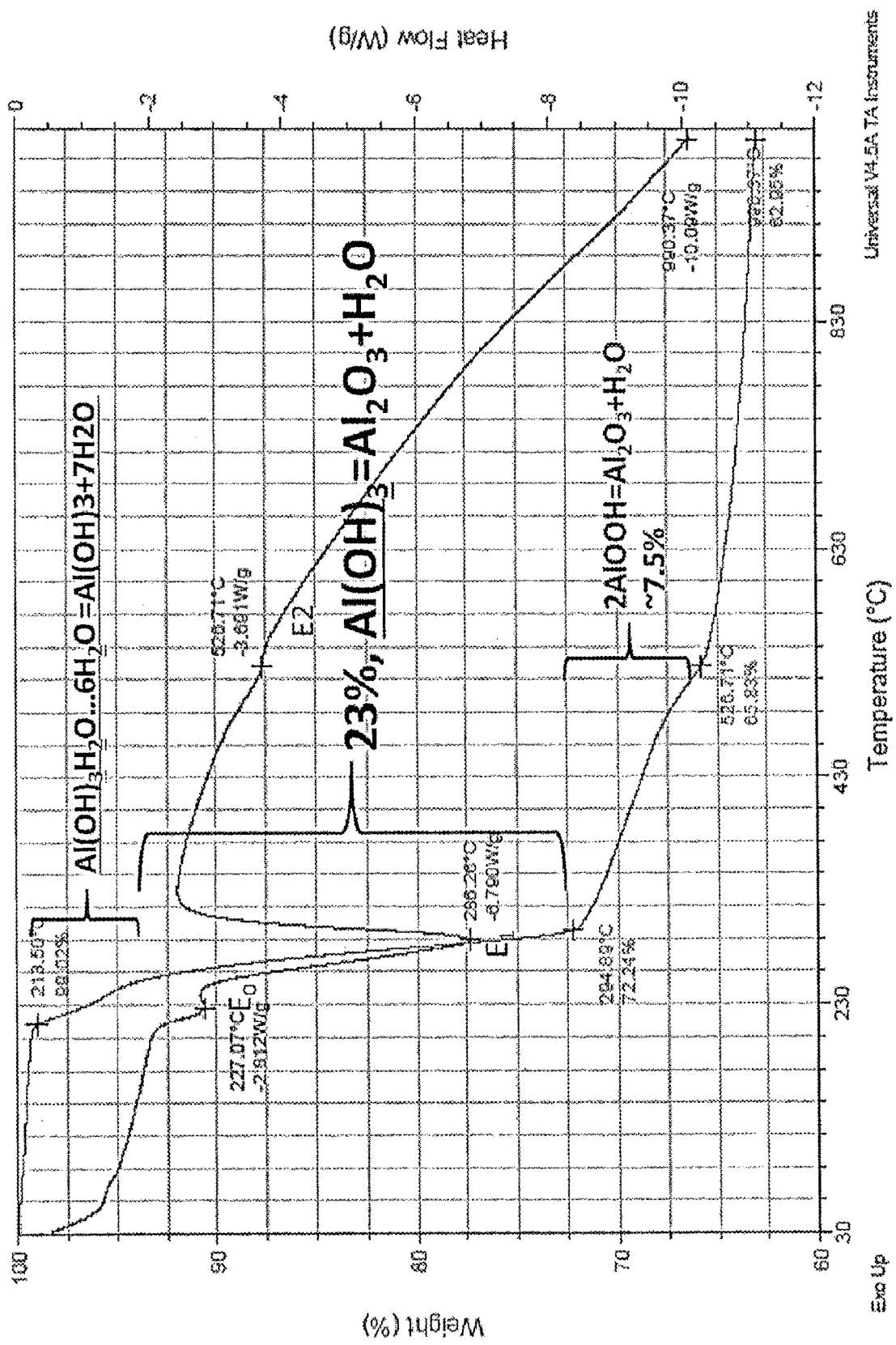
FIG. 9 shows Thermogravimetric Analysis (TGA) incorporating Differential Scanning calorimetry (TGA-DSC) of aluminum-containing nanoparticles formed in accordance with certain embodiments described herein.

As described above with regard to FIGS. 2 and 3, Raman and FTIR experimental studies of the nanomaterials obtained from the solution in accordance with certain embodiments described herein confirm the presence of previously unknown and undocumented forms of aquachelates, namely, aluminum hydroxides $Al(OH)_3H_2O$ and $Al(OH)_3 H_2O \ldots 6H_2O$. FIG. 9 shows thermogravimetric analysis (TGA) incorporating differential scanning calorimetry (TGA-DSC) of aluminum-containing nanoparticles formed in accordance with certain embodiments described herein. The data of FIG. 9 shows that the final powder exhibits a registered transition at 213° C. which can be associated with $Al(OH)_3H_2O \ldots 6H_2O$ by estimated molecular weight loss of the dried nanopowder.

The aluminum-containing nanoparticles formed in accordance with certain embodiments described herein can exhibit properties that were previously not observed for aquachelates. For example, the aluminum-containing nanoparticles can exhibit electrostriction (e.g., change of shape when exposed to an external electric field) and/or magnetostriction (e.g., change of shape when exposed to an external magnetic field).

Figure 10:
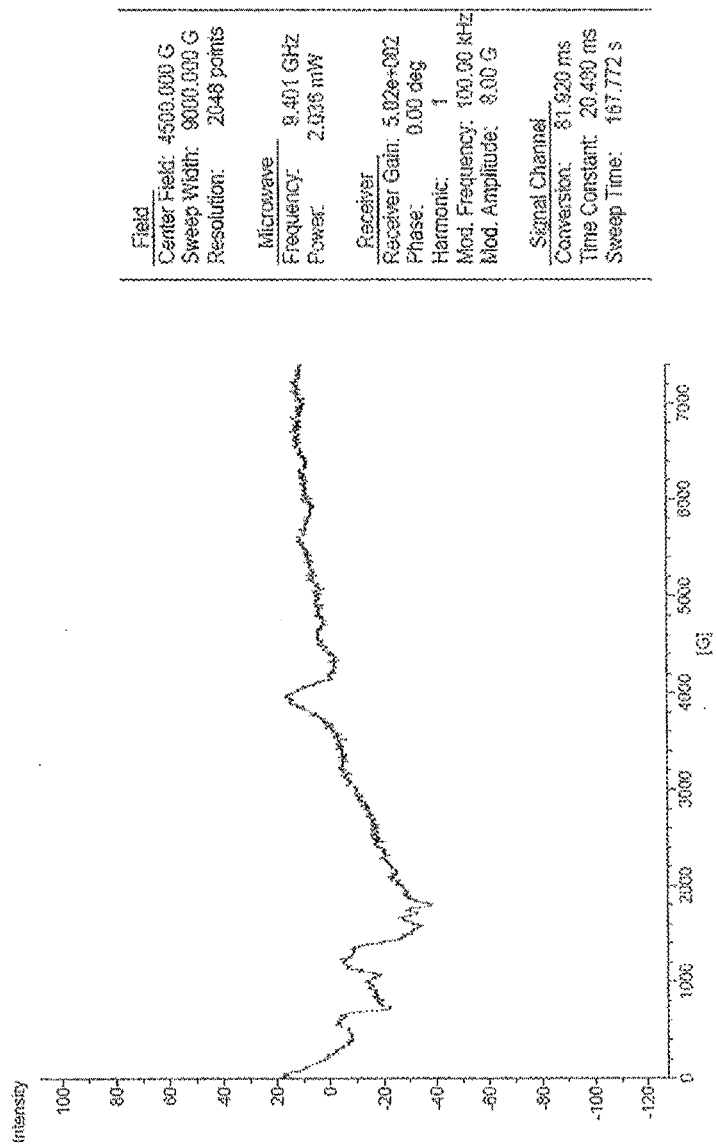
FIG. 10 shows electron paramagnetic resonance (EPR) measurements in parallel mode for the aluminum-containing nanoparticles formed in accordance with certain embodiments described herein.
Figure 11:
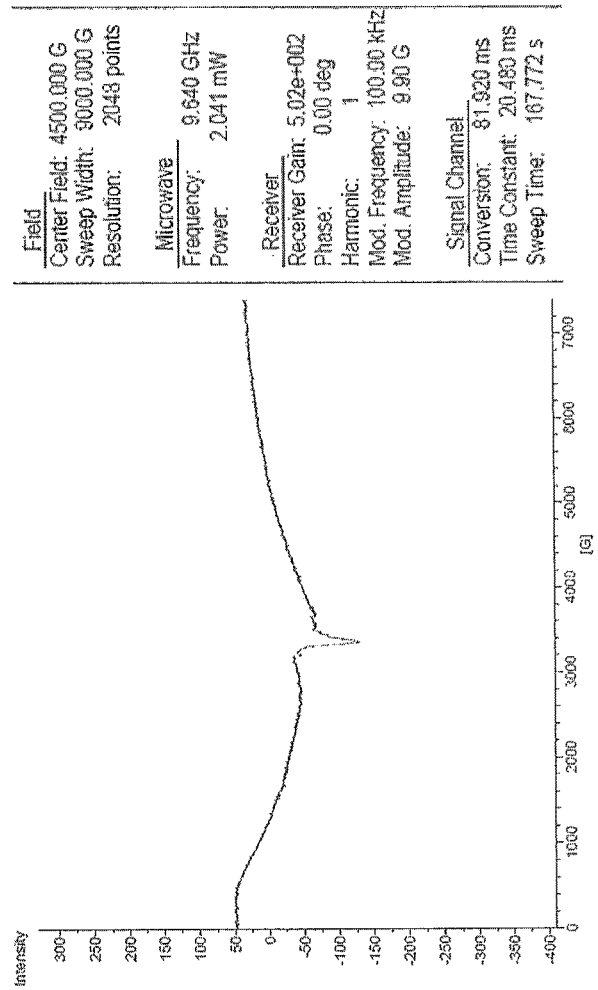
FIG. 11 shows EPR measurements in perpendicular mode for the aluminum-containing nanoparticles formed in accordance with certain embodiments described herein.
Figure 12:
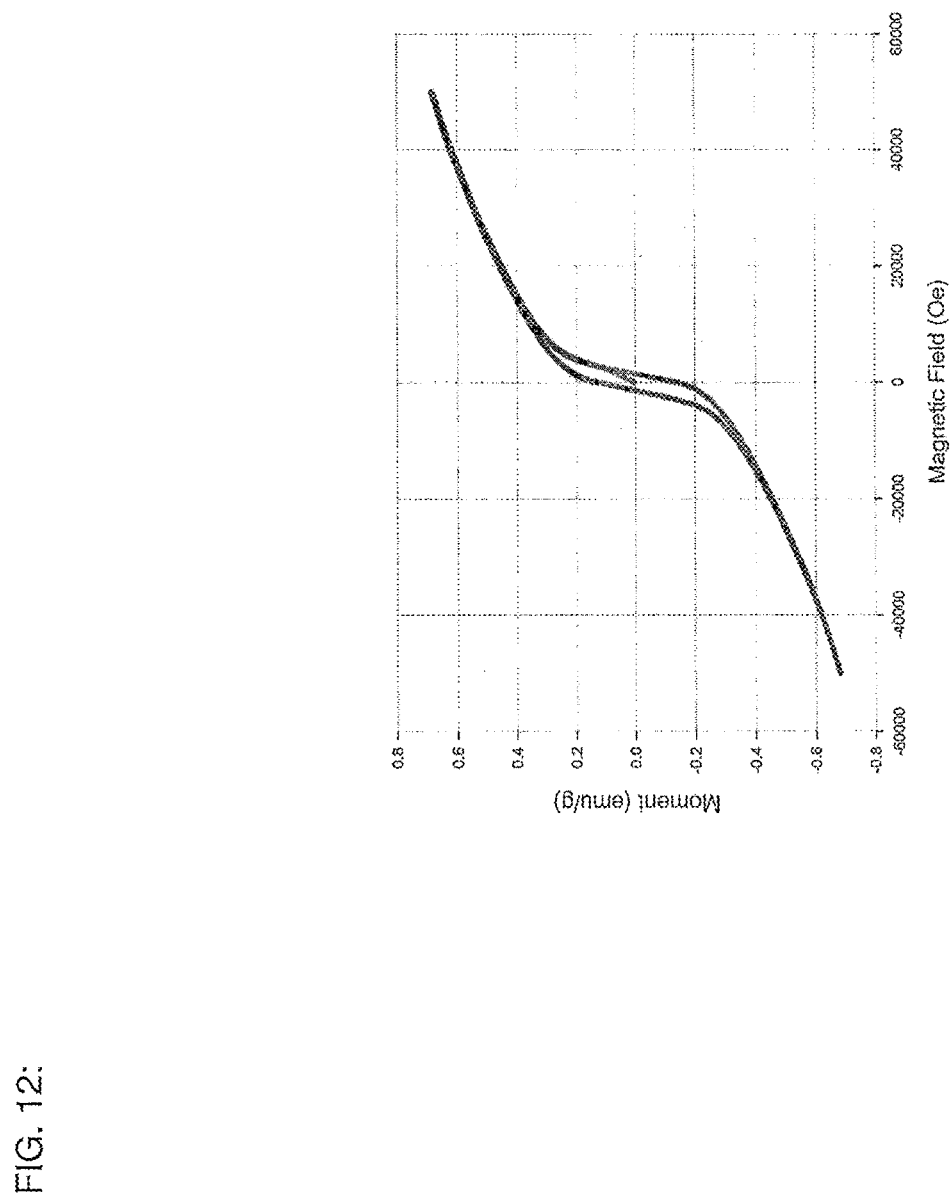
FIG. 12 shows magnetization measurements for the aluminum-containing nanoparticles formed in accordance with certain embodiments described herein.
Figure 13:
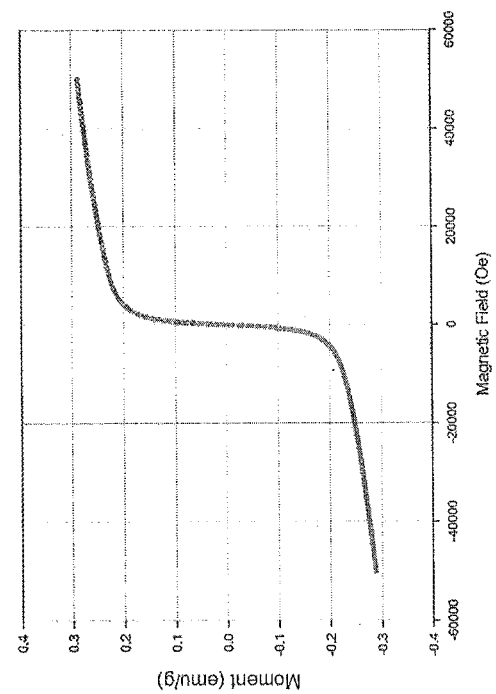
FIG. 13 shows measurements of magnetic moment versus magnetic field at room temperature (300 K) for the aluminum-containing nanoparticles formed in accordance with certain embodiments described herein.
Figure 14:
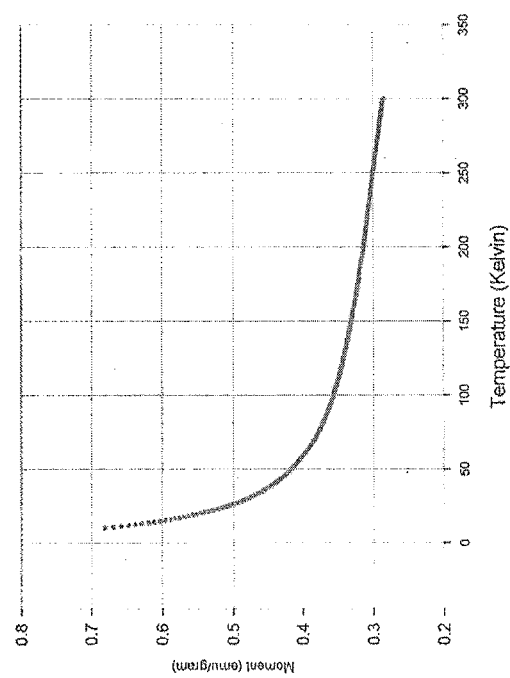
FIG. 14 shows measurements of magnetization versus temperature at a strong magnetic field (50 kOe) for the aluminum-containing nanoparticles formed in accordance with certain embodiments described herein.

FIG. 10 shows electron paramagnetic resonance (EPR) measurements in parallel mode for the aluminum-containing nanoparticles formed in accordance with certain embodiments described herein. The sample was at a temperature of 5 K, and the broadening of the spectral line is indicative of proximity to the critical Curie temperature. FIG. 11 shows EPR measurements in perpendicular mode for the aluminum-containing nanoparticles formed in accordance with certain embodiments described herein. The sample was at a temperature of 75 K, and shows a broadening of the signal width at 75K. FIG. 12 shows magnetization measurements for the aluminum-containing nanoparticles formed in accordance with certain embodiments described herein. The sample was at a temperature of 10 K, and the measurements show spontaneous ferromagnetism up to 10 kOe, coexistence of ferromagnetism and paramagnetism, and some amount of hysteresis. FIG. 13 shows measurements of magnetic moment versus magnetic field at room temperature (300 K) for the aluminum-containing nanoparticles formed in accordance with certain embodiments described herein. The magnetic moment shows linear increases with magnetic field and a strong response to the magnetic field. FIG. 14 shows measurements of magnetization versus temperature at a strong magnetic field (50 kOe) for the aluminum-containing nanoparticles formed in accordance with certain embodiments described herein. The magnetic moment can exist at temperatures above room temperature.

In certain embodiments, the aluminum-containing nanoparticles formed in accordance with certain embodiments described herein can be used as a good stabilizer of hydrogen peroxide when used in rocket fuel.

In certain embodiments, other forms of aluminum aquachelates can be produced using aluminum nanoparticles (e.g., up to 5 nanometers in size) in the presence of powerful electron fluxes, as well as hydrogen and oxygen flows, with other electrochemical methods. In certain embodiments, other new compounds of metals and/or carbon can be formed using nanoparticles (e.g., up to 5 nanometers in size) comprising other metals besides aluminum (e.g., iron, copper, silver, zinc, gold, etc.), carbon (e.g., graphite), or composites in an aqueous solution under high density electron fluxes with the presence of hydrogen and oxygen. In certain embodiments, a method of obtaining metal- or carbon-containing nanoparticles comprises immersing at least a portion of a surface in an electrolytic bath comprising water. The surface comprises a conductive material (e.g., a metal- or carbon-containing material). The method further comprises applying a voltage to the portion of the surface and generating hydrogen gas and oxygen gas from the water via electrolysis. The method further comprises creating nanoparticles using atoms of the conductive material from the portion of the surface. The nanoparticles have sizes less than or equal to 5 nanometers. The aqueous solutions can be acidic or alkaline, with pH levels selected based on the particular solubilities of the conductive material.

The nanoparticles of certain embodiments described herein can improve, even revolutionize, many technology and industry sectors. Many of these benefits can be dependent, at least in part, on the ability to tailor the structures of materials at extremely small scales to achieve specific properties. Described below is a sampling list of some example benefits and applications corresponding to nanoparticles of certain embodiments as described herein:

By including the nanoparticles of certain embodiments, materials can effectively be made stronger, lighter, more durable, more reactive, more sieve-like, or better electrical conductors, among many other things.

The nanoparticles of certain embodiments can be used as additives to surface treatments of fabrics to provide lightweight ballistic energy deflection in personal body armor, or can help fabrics resist wrinkling, staining, and bacterial growth.

The nanoparticles of certain embodiments can be used to form clear nanoparticle films on eyeglasses, computer and camera displays, windows, and other surfaces to make these surfaces water- and residue-repellent, antireflective, self-cleaning, resistant to ultraviolet or infrared light, antifog, antimicrobial, scratch-resistant, or electrically conductive.

Aluminum nanoparticles of certain embodiments can be used for water purification in wastewater treatment especially for landfills.

Magnetic water-repellent nanoparticles of certain embodiments can be used in oil spills to mechanically remove the oil from the water.

The nanoparticles of certain embodiments can be added in nanoscale sensors and electronics with capabilities for health monitoring, solar energy capture, and energy harvesting through movement.

Additives including the nanoparticles of certain embodiments can be useful in making lightweight cars, trucks, airplanes, boats, and space craft, which could lead to significant fuel savings. Additives including the nanoparticles of certain embodiments can be useful in polymer composite materials (e.g., in baseball bats, tennis rackets, bicycles, motorcycle helmets, automobile parts, luggage, and power tool housings), making them lightweight, stiff, durable, and resilient.

Carbon-containing nanoparticles of certain embodiments (e.g., nanotubes) can be used for next-generation air vehicles. For example, the combination of light weight and conductivity makes such materials ideal for applications such as electromagnetic shielding and thermal management to make airplanes stealthy.

The nanoparticles of certain embodiments can be used in three-dimensional printing of any plastics, polymers and with any composite materials.

Materials comprising the nanoparticles of certain embodiments can be used in automotive products which include: high-power rechargeable battery systems and capacitors; thermoelectric materials for temperature control; tires with lower rolling resistance; high-efficiency/low-cost sensors and electronics; thin-film smart solar panels; and fuel additives for cleaner exhaust and extended range.

Adding the nanoparticles of certain embodiments in lubricants and engine oils can significantly reduce friction by 5 times which can significantly extend the lifetimes of moving parts, and can increase efficiency of combustion engine by 10-15%. The nanoparticles of certain embodiments can be useful for lubrication of cannons of artillery and tanks, as well as the lubrication of artillery shells.

The nanoparticles of certain embodiments can be used in scratch resistant paints and sealing products including in antibacterial/antimicrobial coatings and cleansers.

Zinc oxide nanoparticles of certain embodiments can be used in sunscreen to provide protection from sun while appearing invisible on the skin.

The nanoparticles of certain embodiments can be used in transistors, the basic switches that enable all modern computing. Smaller, faster and better transistors may mean computer's entire memory may be stored on a single chip.

The nanoparticles of certain embodiments can greatly enhance alternative energy approaches to help meet the world's increasing energy demands. For example, the nanoparticles of certain embodiments can be used into solar panels to convert sunlight to electricity more efficiently, promising inexpensive solar power in the future. Nanostructured solar cells could be cheaper to manufacture and easier to install, since they can use print or paintable-like manufacturing processes and can be made in flexible rolls rather than discrete panels.

The nanoparticles of certain embodiments in medicine can encapsulate or otherwise be used as method of selective delivery of medication directly to cancer cells and minimize the risk of damage to healthy tissue. The nanoparticles of certain embodiments have the potential to change the way doctors treat cancer and dramatically reduce the toxic effects of chemotherapy. Gold and other metal nanoparticles of certain embodiments can be clinically investigated as potential treatments for cancer and other diseases.

Various embodiments have been described above. Although these descriptions have been made with reference to these specific embodiments, the descriptions are intended to be illustrative and are not intended to be limiting. Various modifications and applications may occur to those skilled in the art without departing from the true spirit and scope as defined in the appended claims.

What is claimed is:

1. A method of obtaining metal- or carbon-containing nanoparticles, the method comprising:
    immersing at least a portion of a surface in an electrolytic bath comprising water to expose at least the portion of the surface to an alkaline aqueous solution, the surface comprising a metal- or carbon-containing material;
    while at least the portion of the surface comprising the metal- or carbon-containing material is exposed to the alkaline aqueous solution, applying a voltage to the immersed portion of the surface and generating hydrogen gas and oxygen gas from the water via electrolysis, the applying the voltage includes exposing at least the portion of the surface comprising the metal- or carbon-containing material to electro-hydraulic shock waves and an electron flux, wherein at least the portion of the surface comprising the metal- or carbon-containing material undergoes electro-erosion which creates nanoparticles using atoms of the metal- or carbon-containing material, the nanoparticles comprising hydrated aluminum oxide and hydroxide complexes, the nanoparticles having a negative surface electrical charge; and
    transforming the nanoparticles comprising the hydrated aluminum oxide and hydroxide complexes into aquachelate nanoparticles by attaching water molecules to the nanoparticles comprising the hydrated aluminum oxide and hydroxide complexes.

2. The method of claim 1, wherein applying the voltage comprises generating electrical discharges within the electrolytic bath, using the water to perform oxidation of at least the portion of the surface within the water, and flowing an electric current through the electrolytic bath.

3. The method of claim 1, wherein the surface comprises a surface of at least one aluminum metallic plate.

4. The method of claim 1, wherein the surface comprises an aluminum oxide layer.

5. The method of claim 1, wherein the electrolytic bath comprises sodium hydroxide.

6. The method of claim 1, wherein the surface comprises a carbon-containing material and said creating nanoparticles uses atoms of the carbon-containing material from the portion of the surface.

\* \* \* \* \*